US010059377B2

(12) United States Patent
Shimizu

(10) Patent No.: US 10,059,377 B2
(45) Date of Patent: Aug. 28, 2018

(54) VEHICLE FRAME STRUCTURE

(71) Applicant: TOYOTA JIDOSHA KABUSHIKI KAISHA, Toyota-shi (JP)

(72) Inventor: Kazuki Shimizu, Kariya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/648,820

(22) Filed: Jul. 13, 2017

(65) Prior Publication Data

US 2018/0037266 A1     Feb. 8, 2018

(30) Foreign Application Priority Data

Aug. 8, 2016  (JP) ................. 2016-155645

(51) Int. Cl.
| | | |
|---|---|---|
| *B62D 21/11* | (2006.01) | |
| *B62D 25/04* | (2006.01) | |
| *B23K 9/00* | (2006.01) | |
| *B62D 29/00* | (2006.01) | |

(52) U.S. Cl.
CPC ............. *B62D 25/04* (2013.01); *B23K 9/00* (2013.01); *B62D 29/008* (2013.01)

(58) Field of Classification Search
CPC .... B62D 21/11; B62D 21/12; B60G 2204/15; B60G 2206/60; B60G 3/20
USPC .................................................. 280/124.109
See application file for complete search history.

(56) References Cited

U.S. PATENT DOCUMENTS

| | | | | |
|---|---|---|---|---|
| 7,520,514 | B2* | 4/2009 | Ogawa | B60G 3/20 |
| | | | | 180/312 |
| 9,610,979 | B2* | 4/2017 | Hirano | B62D 21/11 |
| 2001/0022437 | A1* | 9/2001 | Suzuki | B60G 7/02 |
| | | | | 280/124.134 |
| 2011/0101735 | A1 | 5/2011 | Fujita | |
| 2013/0234469 | A1 | 9/2013 | Fujita | |
| 2013/0234470 | A1 | 9/2013 | Fujita | |
| 2013/0234471 | A1 | 9/2013 | Fujita | |
| 2013/0241238 | A1 | 9/2013 | Fujita | |
| 2014/0252739 | A1* | 9/2014 | Otani | B62D 21/155 |
| | | | | 280/124.109 |
| 2014/0300136 | A1* | 10/2014 | Garnweidner | B62D 21/155 |
| | | | | 296/187.09 |

(Continued)

FOREIGN PATENT DOCUMENTS

| | | |
|---|---|---|
| JP | 2010-13021 | 1/2010 |
| JP | 2016-64725 | 4/2016 |

*Primary Examiner* — Faye M Fleming
(74) *Attorney, Agent, or Firm* — Oblon, McClelland, Maier & Neustadt, L.L.P.

(57) ABSTRACT

Provided is a vehicle frame structure including (1) a first frame member that has a closed cross-sectional shape as seen in a cross-sectional view orthogonal to an extension direction and (2) a second frame member that extends along the first frame member, overlaps a wall surface of the first frame member, and has a hole portion that exposes the wall surface, with an edge portion of the hole portion being joined to the wall surface by a linear welded portion, wherein both end portions of the welded portion are disposed in close proximity to a neutral axis of the first frame member and the second frame member in a case in which the first frame member and the second frame member have undergone bending deformation in an in-plane direction of the wall surface in which the welded portion is formed.

7 Claims, 8 Drawing Sheets

(56) References Cited

U.S. PATENT DOCUMENTS

2016/0083016 A1   3/2016  Imada et al.
2017/0008565 A1*  1/2017  Murata .................. B62D 21/11
2017/0137071 A1*  5/2017  Kurokawa ........... B62D 27/023

* cited by examiner

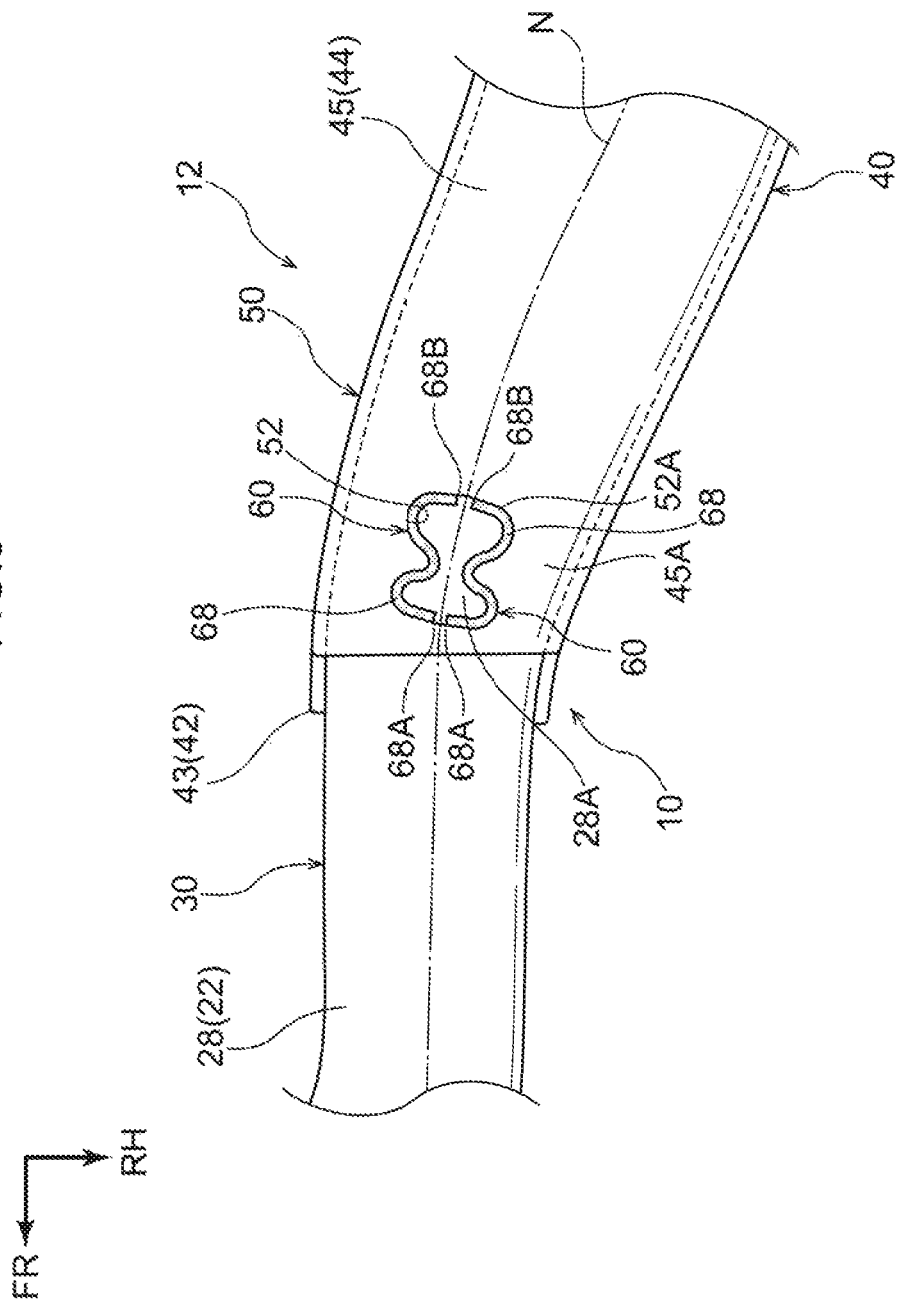

VEHICLE FRAME STRUCTURE

CROSS-REFERENCE TO RELATED APPLICATION

This application claims priority under 35 USC 119 from Japanese Patent Application No. 2016-155645 filed on Aug. 8, 2016, the disclosure of which is incorporated by reference herein.

BACKGROUND

Technical Field

The present disclosure relates to a vehicle frame structure.

Related Art

A structure for a front pillar has been known where an inner panel is laid on top of a hollow member having a closed cross-sectional shape and end portions along the longitudinal direction of the inner panel are linearly welded to wall surfaces of the hollow member (e.g., see Japanese Patent Application Laid-open (JP-A) No. 2010-13021).

However, in a case in which a load is input to a vehicle frame member such as the front pillar and bending deformation in an in-plane direction occurs in the wall surfaces having the linearly welded sections, stress concentrates in both end portions (a starting end portion and a terminating end portion) of each linearly welded section, and both end portions can end up separating.

SUMMARY

The present disclosure obtains a vehicle frame structure which, even if vehicle frame members undergo bending deformation in an in-plane direction of wall surfaces equipped with a linear welded portion, can reduce stress concentration in the end portions of the welded portion and can reduce separation of the end portions of the welded portion.

A first aspect of the present disclosure is a vehicle frame structure including a first frame member and a second frame member. The first frame member has a closed cross-sectional shape as seen in a cross-sectional view orthogonal to an extension direction of the first frame member. The second frame member extends along the first frame member, overlaps a wall surface of the first frame member, and has a hole portion that exposes the wall surface, with an edge portion of the hole portion being joined to the wall surface by a linear welded portion. Both end portions of the welded portion are disposed in close proximity to a neutral axis of the first frame member and the second frame member in a case in which the first frame member and the second frame member have undergone bending deformation in an in-plane direction of the wall surface on which the welded portion is formed.

According to the first aspect, both end portions of the welded portion are disposed in close proximity to the neutral axis of the first frame member and the second frame member when the first frame member and the second frame member have undergone bending deformation in the in-plane direction of the wall surface in which the welded portion is formed. Consequently, compared to a configuration where both end portions of the welded portion are not disposed in close proximity to the neutral axis, stress concentration in the end portions of the welded portion is reduced and separation of the end portions of the welded portion is reduced. "In close proximity to" in the present disclosure means a range, in a width direction orthogonal to the extension direction of the first frame member and the second frame member as seen from the normal direction of the wall surface exposed through the hole portion, from a position of 5.0 mm from the neutral axis heading outward in the width direction from the neutral axis to 25% of the total width thereof.

A second aspect of the present disclosure is the vehicle frame structure of the first aspect, wherein the welded portion is provided on both sides of the neutral axis.

According to the second aspect, the welded portion is provided on both sides of the neutral axis. Consequently, compared to a configuration where the welded portion is provided on just one side of the neutral axis, the weld length of the welded portion is ensured even when there is a small amount of overlap between the first frame member and the second frame member, and joint strength between the first frame member and the second frame member is ensured.

A third aspect of the present disclosure is the vehicle frame structure of the second aspect, wherein the welded portions are provided so as to be line-symmetric to each other with the neutral axis serving as the axis of symmetry.

According to the third aspect, the welded portions are provided so as to be line-symmetric to each other with the neutral axis serving as the axis of symmetry. Consequently, compared to a configuration where the welded portions are not provided so as to be line-symmetric to each other with the neutral axis serving as the axis of symmetry, joint strength between the first frame member and the second frame member is ensured even when the first frame member and the second frame member undergo bending deformation in any direction in the in-plane direction of the wall surface in which the welded portions are formed.

A fourth aspect of the present disclosure is the vehicle frame structure of any one of the first aspect to the third aspect, wherein the welded portion has a first weld line extending along the extension direction, second weld lines extending in a direction orthogonal to the extension direction, and curving weld lines that interconnect the first weld line and the second weld lines.

According to the fourth aspect, the welded portion has the curving weld tines that interconnect the first weld line extending along the extension direction of the first frame member and the second frame member and the second weld lines extending in a direction orthogonal to the extension direction. Consequently, compared to a configuration where the welded portion has bent weld lines that interconnect the first weld line and the second weld lines, the region where stress concentrates is reduced and separation of the welded portion is reduced.

A fifth aspect of the present disclosure is the vehicle frame structure of the fourth aspect, wherein the first weld line is formed in a wave shape.

According to the fifth aspect, the first weld line is formed in a wave shape. Consequently, compared to a configuration where the first weld line is formed in a straight line, the weld length of the welded portion is efficiently increased.

According to the first aspect, even when the vehicle frame members undergo bending deformation in the in-plane direction of the wall surface equipped with the linear welded portion, stress concentration in the end portions of the welded portion can be reduced and separation of the end portions of the welded portion can be reduced.

According to the second aspect, the weld length of the welded portion can be ensured even when there is a small amount of overlap between the first frame member and the second frame member, and joint strength between the first frame member and the second frame member can be ensured.

According to the third aspect, joint strength between the first frame member and the second frame member can be ensured even when the first frame member and the second frame member undergo bending deformation in any direction in the in-plane direction of the wall surface in which the welded portion is formed.

According to the fourth aspect, the region where stress concentrates in the welded portion can be reduced and separation of the welded portion can be reduced.

According to the fifth aspect, the weld length of the welded portion can be efficiently increased.

BRIEF DESCRIPTION OF THE DRAWINGS

Exemplary embodiments of the present disclosure will be described in detail based on the following figures, wherein:

FIG. 8 is an enlarged bottom view showing the shape of a welded portion of a vehicle frame structure pertaining to a fifth exemplary embodiment.

DETAILED DESCRIPTION

Figure 1:
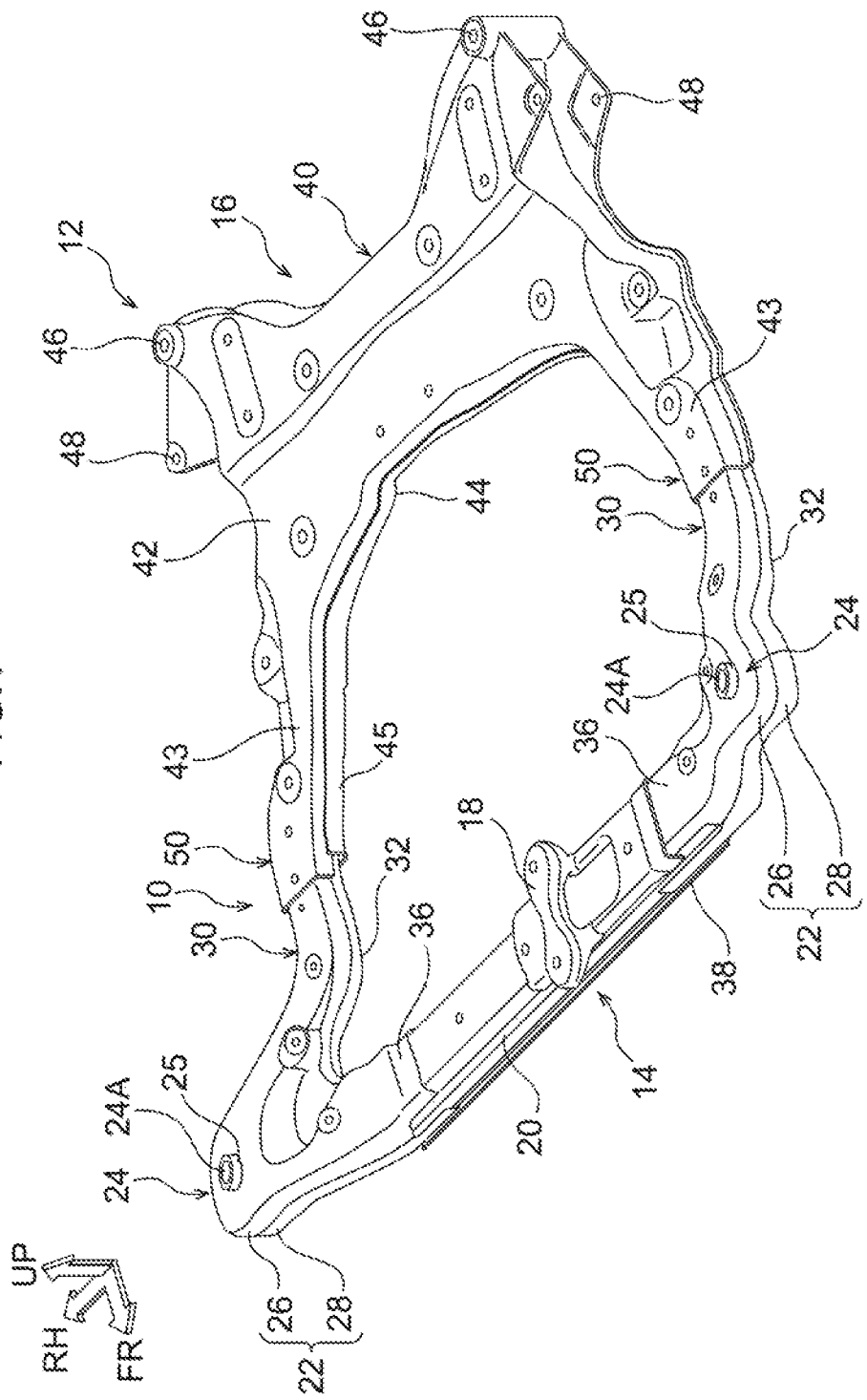
FIG. 1 is a perspective view showing, as seen from above, a suspension member equipped with a vehicle frame structure pertaining to a first exemplary embodiment.

Exemplary embodiments pertaining to the present disclosure will be described in detail below based on the drawings. For convenience of description, arrow UP appropriately shown in the drawings indicates a vehicle body upper direction, arrow FR indicates a vehicle body front direction, and arrow RH indicates a vehicle body right direction. Furthermore, when the directions of upper/lower, front/rear and right/left are used without further specification in the following description, these will be understood to mean upper/lower in the vehicle body vertical direction, front/rear in the vehicle body front and rear direction, and right/left in the vehicle width direction.

First Exemplary Embodiment

First, a suspension member 12 equipped with a vehicle frame structure 10 pertaining to a first exemplary embodiment will be described. The suspension member 12 shown in FIG. 1 to FIG. 3 is supported on the lower side of front portions of a right and left pair of from side members (not shown in the drawings) extending along the vehicle body front and rear direction in a state in which the suspension member 12 is hung from the front side members.

Each front side member has a kick portion for positioning the vehicle body front portion higher than the vehicle body rear portion. Consequently, the suspension member 12 is configured in such a way that mount portions 24 of a later-described right and left pair of front body mounts 22 that are the front end portion of the suspension member 12 are attached to front end portions of the front side members on the vehicle body front side of the kick portions and in such a way that a right and left pair of fastening portions 46 of a later-described rear cross member 40 that is the rear end portion of the suspension member 12 are attached to lower end portions of the kick portions.

Figure 2:
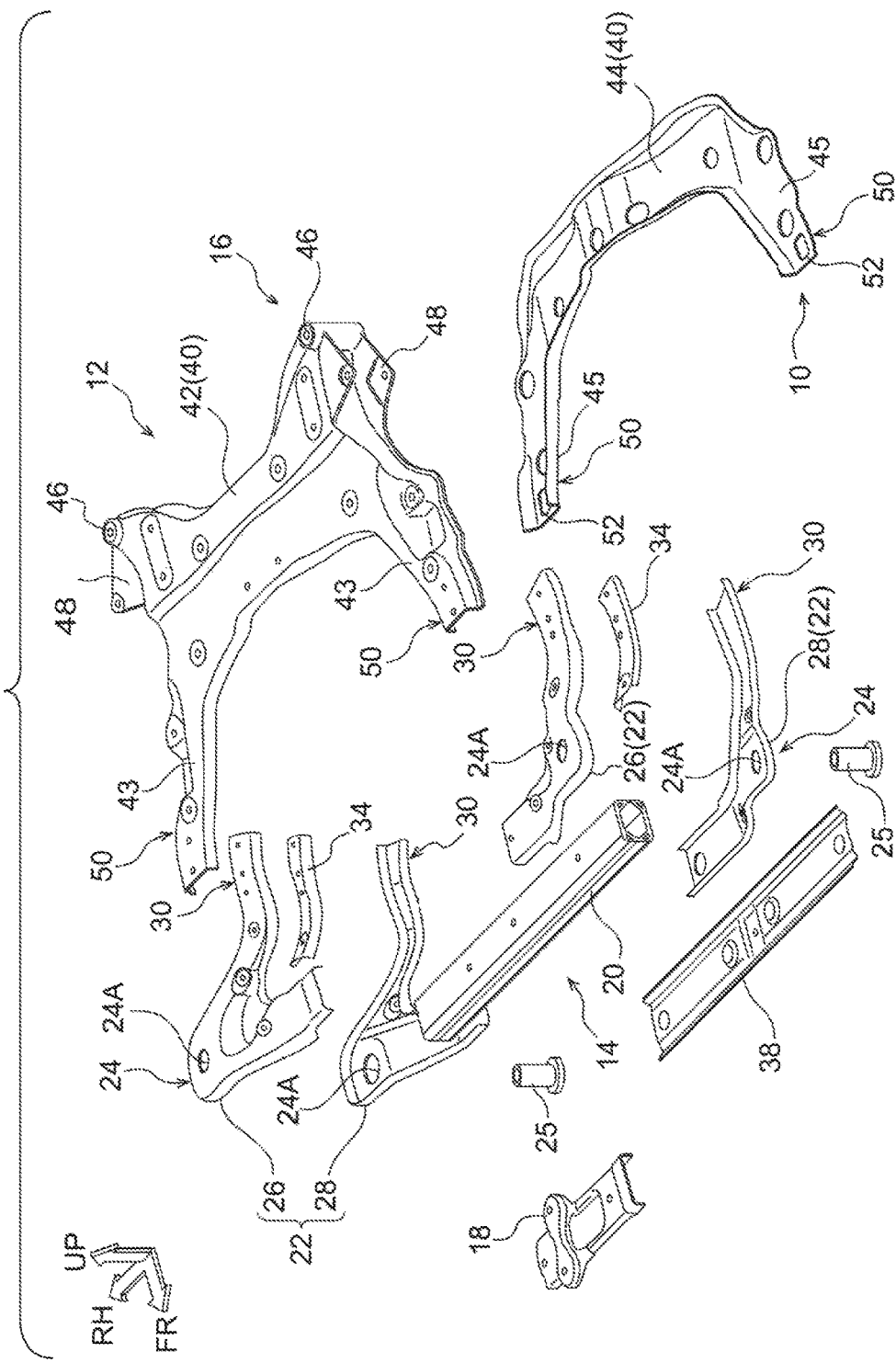
FIG. 2 is an exploded perspective view showing, as seen from above, the suspension member equipped with the vehicle frame structure pertaining to the first exemplary embodiment.
Figure 3:
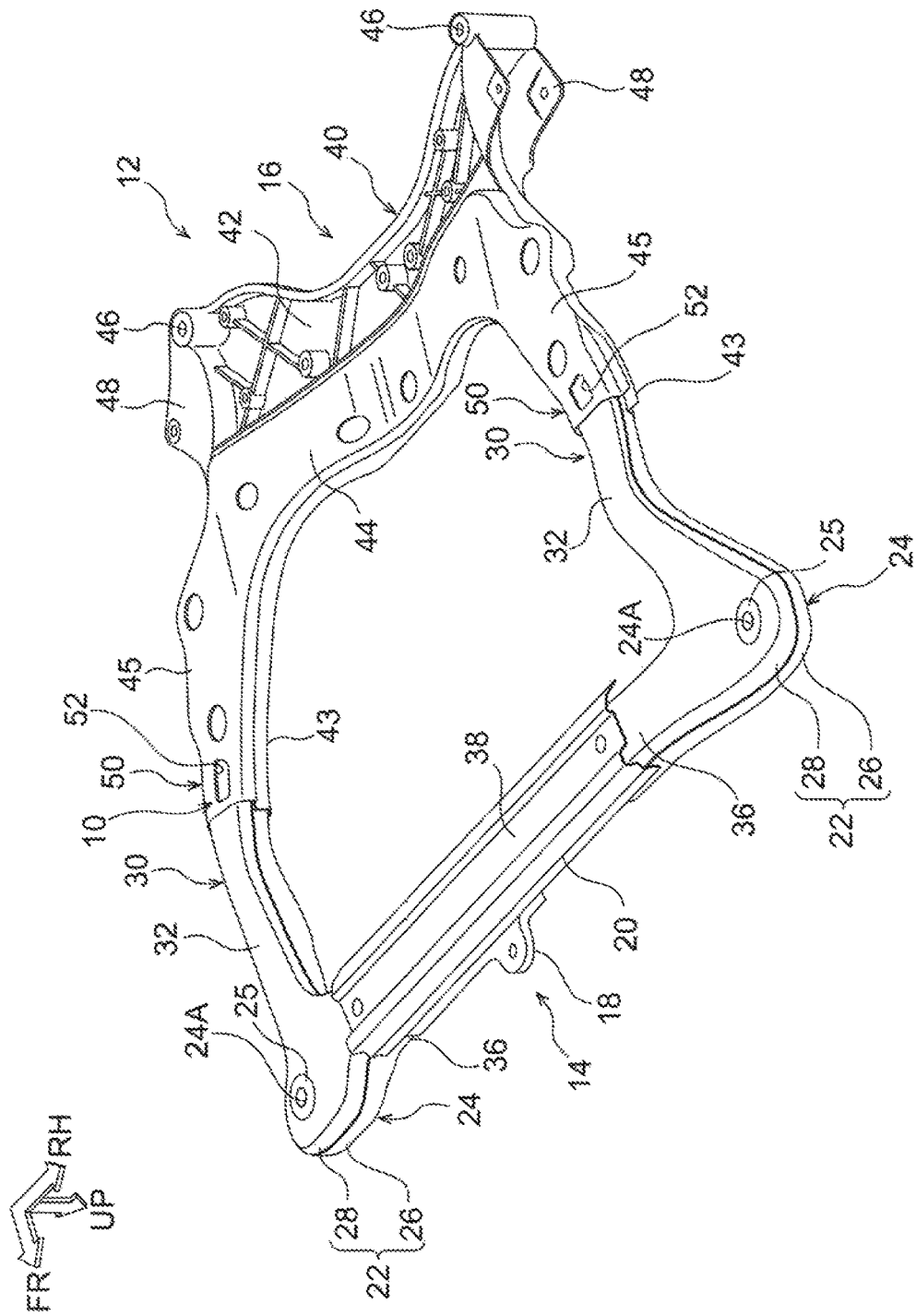
FIG. 3 is a perspective view showing, as seen from below, the suspension member equipped with the vehicle frame structure pertaining to the first exemplary embodiment.

As shown in FIG. 1 to FIG. 3, the suspension member 12 has a front frame 14, which is substantially U-shaped as seen in a plan view, and a rear frame 16, which is substantially U-shaped as seen in a plan view and is joined to the vehicle body rear side of the front frame 14. The front frame 14 has a front cross member 20, which extends in the vehicle width direction, and a right and left pair of front body mounts 22, which are provided on both longitudinal direction (vehicle width direction) end portions of the front cross member 20.

The front cross member 20 is formed in a certain rectangular closed cross-sectional shape, as seen in a cross-sectional view orthogonal to the longitudinal direction (vehicle width direction), by extruding a light metal material such as aluminum alloy. Each front body mount 22 is formed in a substantially L-shape as seen in a plan view by stamping a light metal material such as aluminum alloy, and is configured to include an upper mount 26, which has an open cross-sectional shape whose vehicle body lower side is open, and a lower mount 28, which has an open cross-sectional shape whose vehicle body upper side is open.

Additionally, the corner portions of the right and left pair of front body mounts 22 are mount portions 24 supported on the front end portions of the front side members, and through holes 24A running in the vertical direction are formed in the mount portions 24. Cylindrical collar members 25 (see FIG. 2) are inserted from the vehicle body lower side into, and attached to, the through holes 24A.

Furthermore, the sections of the front body mounts 22 on the vehicle width direction inner sides of the mount portions 24 are cross portions 36 that each have a rectangular closed cross-sectional shape and extend inward in the vehicle width direction. Additionally, the cross portions 36 are placed over both vehicle width direction end portions of the front cross member 20 (in other words, both vehicle width direction end portions of the from cross member 20 are inserted inside the cross portions 36), and the side edge portions of the vehicle width direction inner end portions of the cross portions 36 are linearly joined by arc welding to the wall surfaces (the upper surface, the lower surface, the front surface, and the rear surface) of the front cross member 20 overlapped by those edge portions.

An engine mount bracket 18, which is formed in an open cross-sectional shape whose vehicle body lower side is open and which has a shorter length than the front cross member 20, is joined by bolt fastening or welding to the substantially central portion of the upper surface of the front cross member 20. That is to say, a power unit (not shown in the drawings) including an engine and a transmission is disposed on the vehicle body upper side of the suspension member 12, and the power unit is configured to be supported from the vehicle body lower side at least by the suspension member 12.

Furthermore, a cross plate 38, which is formed in an open cross-sectional shape whose vehicle body upper side is open and which has substantially the same length as the front cross member 20, is joined by bolt fastening or welding to the lower surface of the front cross member 20. The entire lower surface of the front cross member 20 is configured to be protected by the cross plate 38. The engine mount bracket 18 is made by die casting a light metal material such as aluminum alloy, and the cross plate 38 is made by stamping a light metal material such as aluminum alloy.

The sections of the front body mounts 22 on the vehicle body rear sides of the mount portions 24 are a right and left pair of front side rail portions 30 serving as first frame members extending in the vehicle body from and rear direction. The front side rail portions 30 each have a rectangular closed cross-sectional shape as seen in a cross-sectional view orthogonal to the extension direction, and bent portions 32 bent toward the vehicle body lower side (bent downward) as seen in a side view from the vehicle width direction are formed in the substantially central portions of the front side rail portions 30 in the extension direction (the vehicle body front and rear direction).

Furthermore, reinforcement rail portions 34 (see FIG. 2) extending in the vehicle body front and rear direction are provided between the front side rail portions 30 of the upper mounts 26 and the front side rail portions 30 of the lower mounts 28. The reinforcement rail portions 34 are each formed in an open cross-sectional shape whose vehicle body lower side is open by stamping a light metal material such as aluminum alloy, and the reinforcement rail portions 34 extend as far as the rear end portions of the front side rail portions 30 so as to reinforce the front side rail portions 30 from their bent portions 32 to their rear end portions.

The rear frame 16 has a mar cross member 40 extending in the vehicle width direction. The rear cross member 40 is configured to include an upper member 42 and a lower member 44, which is provided on the lower surface side of the upper member 42 and protects the lower surface side. The upper member 42 is formed in an open cross-sectional shape whose vehicle body lower side is open by die casting a light metal material such as aluminum alloy, and the lower member 44 is formed in an open cross-sectional shape whose vehicle body upper side is open by stamping a light metal material such as aluminum alloy.

Fastening portions 46 for attachment to the lower end portions of the kick portions of the front side members are formed in the rear portions of both vehicle width direction ends of the upper member 42. Additionally, lower arm attachment portions 48 for attaching lower arms (not shown in the drawings) configuring suspension arms (not shown in the drawings) are formed in both vehicle width direction end portions of the upper member 42 on the vehicle body front sides of the fastening portions 46.

Furthermore, a right and left pair of upper rail portions 43 extending toward the vehicle body front direction are integrally formed in the front portions of both vehicle width direction ends of the upper member 42, and a right and left pair of lower rail portions 45 extending toward the vehicle body front direction are integrally formed in the front portions of both vehicle width direction ends of the lower member 44. The right and left side surfaces of the upper rail portions 43 and the right and left side surfaces of the lower rail portions 45 are linearly joined to each other by arc welding to thereby configure a right and left pair of rear side rail portions 50 serving as second frame members each having a rectangular closed cross-sectional shape as seen in a cross-sectional view orthogonal to the extension direction.

Additionally, the front portions of the rear side rail portions 50 are placed over the rear portions of the front side rail portions 30 (the rear portions of the front side rail portions 30 are inserted inside the rear side rail portions 50), and the side edge portions of the front portions of the rear side rail portions 50 are linearly joined by arc welding to the wall surfaces (the upper surface, the lower surface, and the right and left side surfaces) of the rear portions of the front side rail portions 30 overlapped by those edge portions.

That is to say, the rear side rail portions 50 extend along the front side rail portions 30, the side edge portions of the front portions of the upper rail portions 43 are arc welded to the upper surface and the right and left side surfaces of the rear portions of the upper mounts 26 configuring the front side rail portions 30, and the side edge portions of the front portions of the lower rail portions 4S are arc welded to the lower surface and the right and left side surfaces of the rear portions of the lower mounts 28 configuring the front side rail portions 30.

Figure 4:
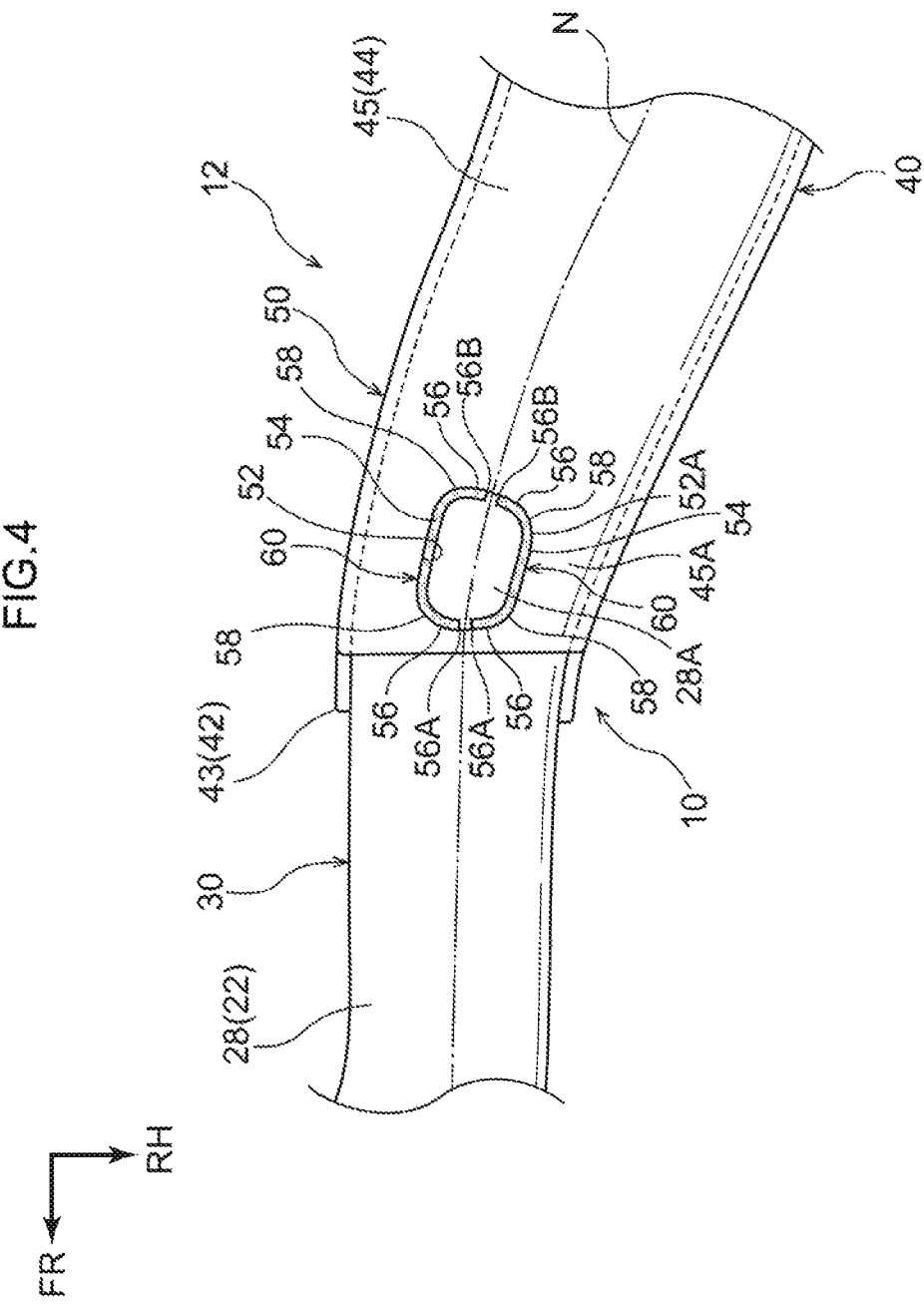
FIG. 4 is an enlarged bottom view showing the shape of a welded portion of the vehicle frame structure pertaining to the first exemplary embodiment.

Furthermore, as shown in FIG. 3 and FIG. 4, hole portions 52, which are substantially elliptical in shape as seen in a bottom view and expose rear portion lower surfaces 28A (wall surfaces) of the lower mounts 28 configuring the front side rail portions 30, are formed in front portion lower surfaces 45A of the lower rail portions 45 configuring the rear side rail portions 50. Additionally, as shown in FIG. 4, regions, excluding some parts (on a later-described neutral axis N), of edge portions 52A configuring the hole portions 52 are linearly arc welded to the rear portion lower surfaces 28A of the lower mounts 28 (hereinafter these regions will be called "welded portions 60").

In this way is formed the suspension member 12, in which the front frame 14 and the rear frame 16 are integrally joined to each other as a result of the front side rail portions 30 and the rear side rail portions 50 being joined to each other at plural arc welded joint portions including the welded portions 60 and in which the front side rail portions 30 and the rear side rail portions 50 extend in succession in the vehicle body front and rear direction and in which the front cross member 20 and the rear cross member 40 extend in the vehicle width direction.

Next, the welded portions 60, at which the front side rail portions 30 and the rear side rail portions 50 are arc welded to each other, will be described in greater detail based on FIG. 4.

The front side rail portions 30 and the rear side rail portions 50 of the suspension member 12 undergo bending deformation in which they bend outward or inward in the vehicle width direction (the right and left direction) due to a load heading outward or inward in the vehicle width direction and input by an offset frontal collision to the vehicle, and also undergo bending deformation in which they bend outward or inward in the vehicle width direction (the right and left direction) due to loads heading outward or inward in the vehicle width direction and input from the suspension arms (lower arms) during vehicle travel.

Here, as shown in FIG. 4, in the vehicle width direction middle portions of the upper surfaces and the lower surfaces of the front side rail portions 30 and the rear side rail portions 50, there are linear regions—that is, neutral axes N—along the longitudinal direction (extension direction) of the front side rail portions 30 and the rear side rail portions 50 at which it is most difficult for bending stress (tensile deformation force and compressive deformation force) to act in a case in which the front side rail portions 30 and the rear side rail portions 50 have undergone bending deformation in the in-plane direction (vehicle width direction) of those surfaces.

Consequently, each welded portion 60 is configured to be linearly arc welded so that both end portions thereof (a starting end portion 56A and a terminating end portion 56B described later) are disposed in close proximity to the neutral axis N. Specifically, each welded portion 60 has a first weld line 54 extending along the extension direction of the front side rail portion 30 and the rear side rail portion 50, two second weld lines 56 extending in a direction orthogonal to the extension direction, and curving weld lines 58 that integrally connect both end portions of the first weld line 54 to one end portion each of the second weld lines 56.

Additionally, the other end portion of one of the second weld lines 56 is a starting end portion 56A of arc welding, the other end portion of the other of the second weld lines 56 is a terminating end portion 56B of arc welding, and the starting end portion 56A and the terminating end portion 56B are disposed in close proximity to the neutral axis N. It is preferred that the welded portions 60 be provided on both the right and left sides of the neutral axis N so as to form a substantially line-symmetrical shape with the neutral axis N serving as the axis of symmetry as shown in FIG. 4, but it is also alright if the welded portions 60 are not provided in a substantially line-symmetrical shape.

Furthermore, the welded portions 60 shown in FIG. 4 are configured in such a way that the starting end portion 56A and the terminating end portion 56B of arc welding are on one side of the neutral axis N and the starting end portion 56A and the terminating end portion 56B of arc welding are also on the other side of the neutral axis N, but the welded portions 60 may also be configured in such a way that the starting end portions 56A of arc welding are on one side of the neutral axis N and the terminating end portions 56B of arc welding are on the other side. That is to say, although it is not shown in the drawings, the welded portions 60 may also be configured to be arc welded in substantially C-shapes that straddle the neutral axis N.

Next, the operation of the suspension member 12 equipped with the vehicle frame structure 10 pertaining to the first exemplary embodiment with the above configuration will be described.

As described above, both end portions of each welded portion 60 (the starting end portion 56A and the terminating end portion 56B of arc welding) are disposed in positions in close proximity to the neutral axis N of the front side rail portion 30 and the rear side rail portion 50 in a case in which the front side rail portion 30 and the rear side rail portion 50 have undergone bending deformation in the vehicle width direction (which is also the right and left direction; the in-plane direction of the upper surfaces and the lower surfaces of the front side rail portion 30 and the rear side rail portion 50).

Here, the neutral axis N is a region that becomes a boundary line between compressive deformation and tensile deformation in a case in which the front side rail portion 30 and the rear side rail portion 50 have undergone bending deformation in the vehicle width direction. For that reason, the amount of bending deformation of the front side rail portion 30 and the rear side rail portion 50 in the vehicle width direction becomes smaller in the area around the neutral axis N. Consequently, by disposing both end portions of the welded portion 60 in close proximity to the neutral axis N, the amount of displacement of both end portions can be reduced.

That is to say, if both end portions of the welded portion 60—that is, the starting end portion 56A and the terminating end portion 56B of arc welding—are disposed in close proximity to the neutral axis N, stress concentration in the starting end portion 56A and the terminating end portion 56B of the welded portion 60 can be reduced compared to a configuration where both end portions of the welded portion 60 are not disposed in close proximity to the neutral axis N. Thus, separation of the starting end portion 56A and the terminating end portion 56B of the welded portion 60 can be reduced or prevented.

Moreover, the welded portion 60 is provided on both the right and left sides of the neutral axis N, so compared to a configuration where the welded portion 60 is provided on just one of the right and left sides of the neutral axis N, the weld length of the welded portion 60 can be ensured even in a configuration where there is a small amount of overlap between the rear portion of the front side rail portion 30 and the front portion of the rear side rail portion 50 which overlap each other, and joint strength between the rear portion of the front side rail portion 30 and the front portion of the rear side rail portion 50 can be ensured.

Furthermore, the welded portions 60 are provided so as to form a substantially line-symmetrical shape with the neutral axis N serving as the axis of symmetry, so compared to a configuration where the welded portions 60 are not provided so as to form a substantially line-symmetrical shape with the neutral axis N serving as the axis of symmetry, joint strength between the rear portion of the front side rail portion 30 and the front portion of the rear side rail portion 50 can be ensured even if the front side rail portion 30 and the rear side rail portion 50 undergo bending deformation in any direction of the in-plane direction (the right and left direction) of the rear portion lower surface 28A and the front portion lower surface 45A in which the welded portions 60 are formed.

Furthermore, the welded portion 60 has the curving weld lines 58 that integrally interconnect the first weld line 54 extending along the extension direction of the front side rail portion 30 and the rear side rail portion 50 and the second weld lines 56 extending in a direction orthogonal to the extension direction. Consequently, compared to a configuration where the welded portion 60 has bent weld lines (not shown in the drawings) that integrally interconnect the first weld line 54 and the second weld lines 56, the region where stress concentrates can be reduced and separation of the welded portion 60 can be reduced.

Furthermore, the front side rail portion 30 and the rear side rail portion 50 are linearly joined to each other by arc welding even outside the welded portions 60, so the front side rail portion 30 and the rear side rail portion 50 can be strongly joined to each other and the ingress of foreign matter between them can be reduced or prevented. Consequently, galvanic corrosion can also be reduced or prevented from occurring between the front side rail portion 30 and the rear side rail portion 50. The same also holds true for the arc welded linear joint portions between the cross portions 36 of the front body mounts 22 and the front cross member 20.

Furthermore, the engine mount bracket 18 and the upper member 42 of the rear cross member 40 are formed by die casting a light metal material such as aluminum alloy, so seats and bosses for attaching other parts can be easily formed. That is, the engine mourn bracket 18 and the upper member 42 of the rear cross member 40 have a high rigidity, have a high degree of freedom in terms of their shapes, and can contribute to a reduction in the number of parts (streamlining of shape).

Furthermore, the lower arms are configured to be attached only to the upper member 42 of the rear cross member 40, so the rigidity with which the suspension member 12 supports the lower arms can be improved. Consequently, the occurrence of noise caused by vibration that is input from front wheels (not shown in the drawings) and the power unit can be reduced.

Second Exemplary Embodiment

Next, a suspension member 12 equipped with a vehicle flame structure 10 pertaining to a second exemplary embodiment will be described. The same reference signs are assigned to parts that are the same as those in the first exemplary embodiment, and detailed description (also including shared operation) will be appropriately omitted.

Figure 5:
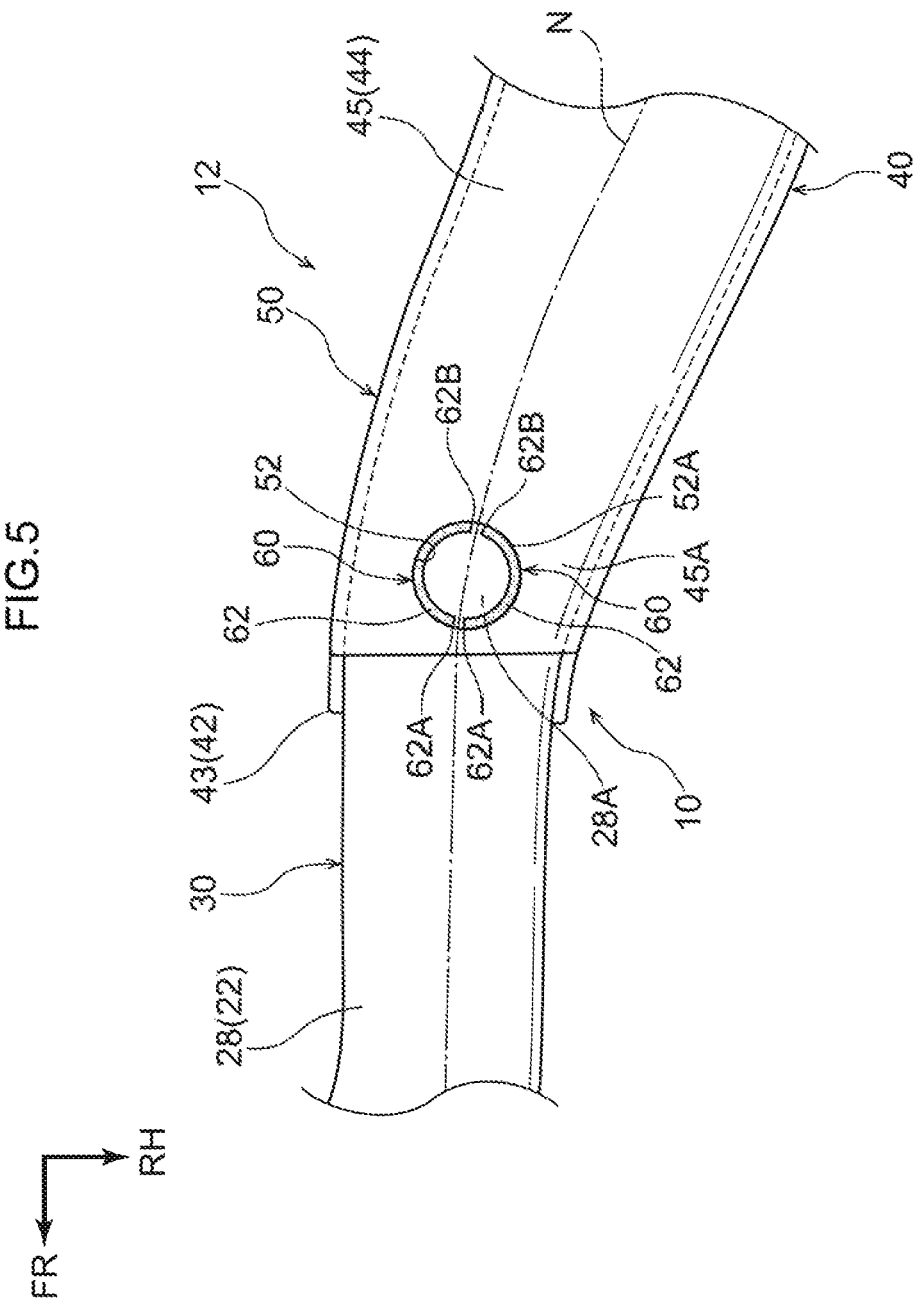
FIG. 5 is an enlarged bottom view showing the shape of a welded portion of a vehicle frame structure pertaining to a second exemplary embodiment.

As shown in FIG. 5, the second exemplary embodiment differs from the first exemplary embodiment only in that the shape of the hole portion 52 formed in the front portion lower surface 45A of the lower rail portion 45 configuring the rear side rail portion 50 is a substantially circular shape as seen in a bottom view, with regions, excluding some parts (on the neutral axis N), of the edge portion 52A configuring the hole portion 52 being linearly arc welded to the rear portion lower surface 28A of the lower mount 28 configuring the from side rail portion 30.

That is to say, the welded portions 60 have semicircular arc-shaped weld lines 62 that form a substantially line-symmetrical shape whose axis of symmetry is the neutral axis N, and a starting end portion 62A and a terminating end portion 62B of each semicircular arc-shaped weld line 62 on both the right and left sides of the neutral axis N are disposed in close proximity to the neutral axis N. Even in the case of the welded portions 60 having the semicircular arc-shaped weld lines 62, the same operation as those in the first exemplary embodiment are obtained. In particular, the semicircular arc-shaped weld lines 62 can reduce separation of the welded portions 60 because they can reduce the region where stress concentrates.

Third Exemplary Embodiment

Next, a suspension member 12 equipped with a vehicle frame structure 10 pertaining to a third embodiment will be described. The same reference signs are assigned to parts that are the same as those in the first exemplary embodiment, and detailed description (also including shared operation) will be appropriately omitted.

Figure 6:
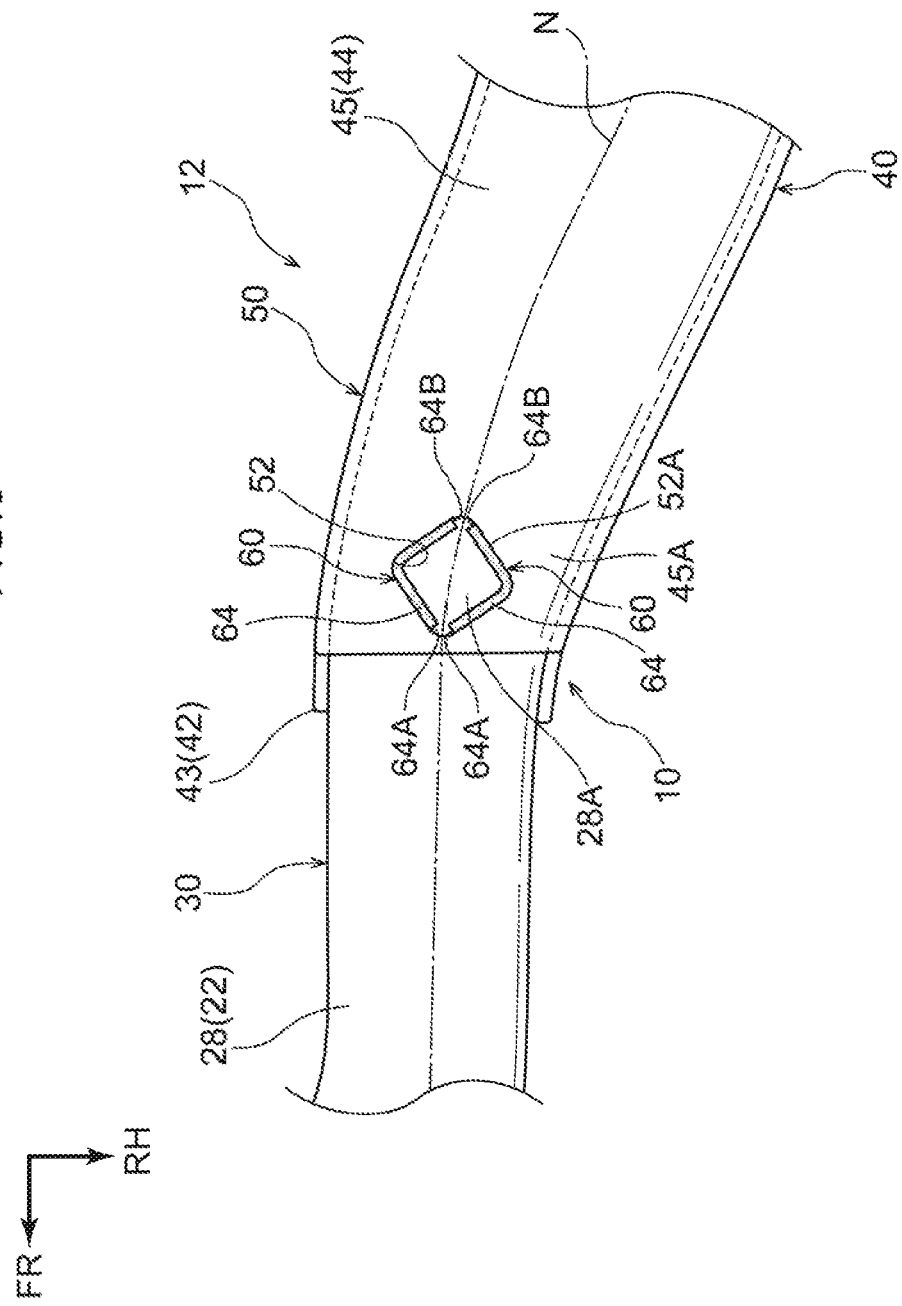
FIG. 6 is an enlarged bottom view showing the shape of a welded portion of a vehicle frame structure pertaining to a third exemplary embodiment.

As shown in FIG. 6, the third exemplary embodiment differs from the first exemplary embodiment only in that the shape of the hole portion 52 formed in the front portion lower surface 45A of the lower rail portion 45 configuring the rear side rail portion 50 is a substantially rhombus shape (a substantially square shape) as seen in a bottom view, with regions, excluding some parts (on the neutral axis N), of the edge portion 52A configuring the hole portion 52 being linearly arc welded to the rear portion lower surface 28A of the lower mount 28 configuring the front side rail portion 30.

That is to say, the welded portions 60 have V-shaped weld lines 64 that form a substantially line-symmetrical shape whose axis of symmetry is the neutral axis N, and a starting end portion 64A and a terminating end portion 64B of each V-shaped weld line 64 on both the right and left sides of the neutral axis N are disposed in close proximity to the neutral axis N. Even in the case of the welded portions 60 having the V-shaped weld lines 64, the same operation as those in the first exemplary embodiment are obtained, except for the operation of being able to reduce the region where stress concentrates.

Fourth Exemplary Embodiment

Next, a suspension member 12 equipped with a vehicle frame structure 10 pertaining to a fourth exemplary embodiment will be described. The same reference signs are assigned to parts that are the same as those in the first exemplary embodiment, and detailed description (also including shared operation) will be appropriately omitted.

Figure 7:
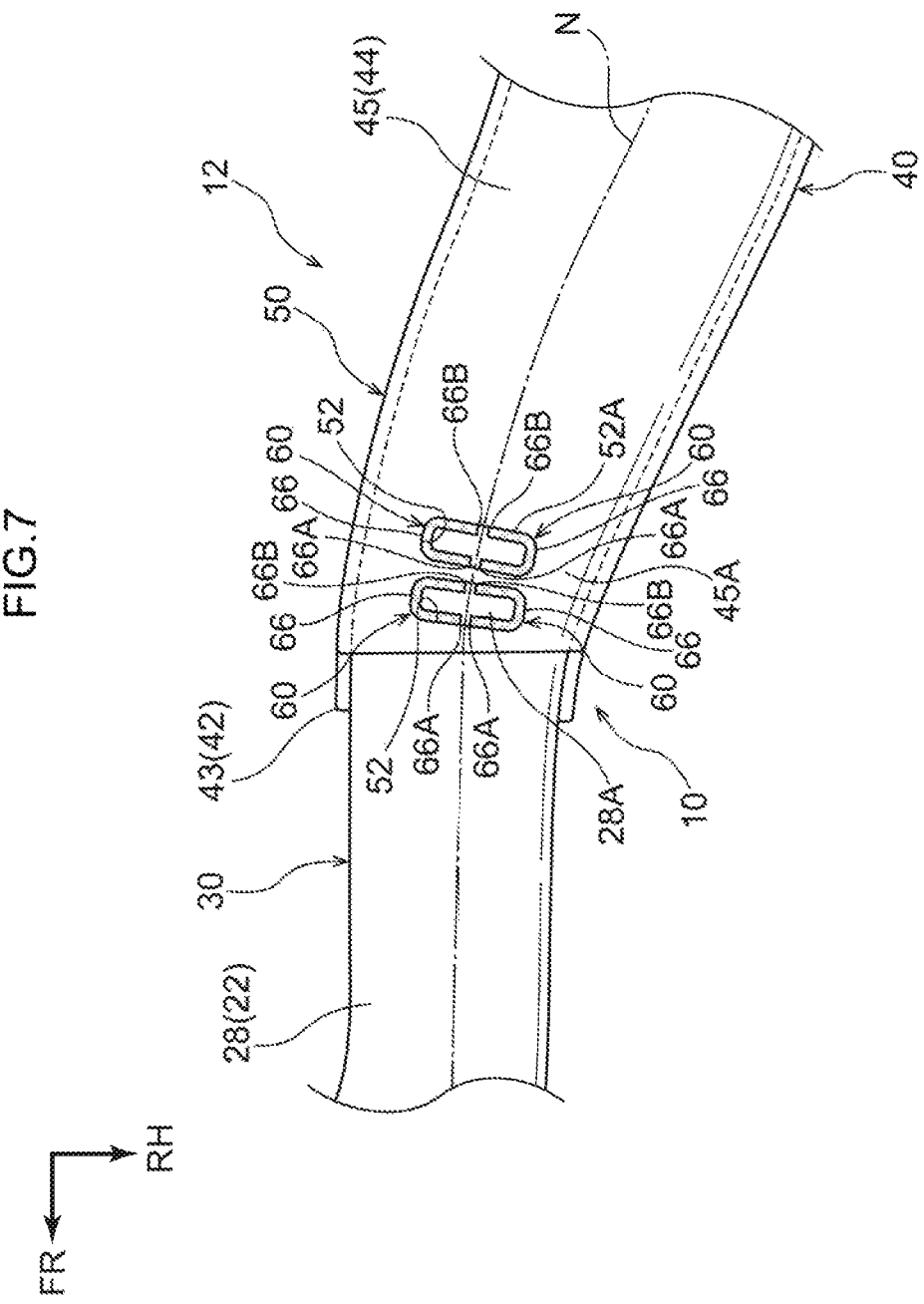
FIG. 7 is an enlarged bottom view showing the shape of a welded portion of a vehicle frame structure pertaining to a fourth exemplary embodiment.

As shown in FIG. 7, the fourth exemplary embodiment differs from the first exemplary embodiment only in that the shape of the hole portion 52 formed in the front portion lower surface 45A of the lower rail portion 45 configuring the rear side rail portion 50 is a substantially rectangular shape whose longitudinal direction coincides with the vehicle width direction (the right and left direction) as seen in a bottom view and in that plural (two in FIG. 7) hole portions 52 are provided in the extension direction of the rear side rail portion 50, with regions, excluding some parts (on the neutral axis N), of the edge portion 52A configuring each hole portion 52 being linearly arc welded to the rear portion lower surface 28A of the lower mount 28 configuring the front side rail portion 30.

That is to say, the welded portions 60 have U-shaped weld lines 66 that form a substantially line-symmetrical shape whose axis of symmetry is the neutral axis N, and a starting end portion 66A and a terminating end portion 66B of each V-shaped weld line 66 on both the right and left sides of the neutral axis N are disposed in close proximity to the neutral axis N. Even in the case of the welded portions 60 having the U-shaped weld lines 66, the same operation as those in the first exemplary embodiment are obtained. In particular, if plural welded portions 60 are provided, the weld length thereof can be increased, so the joint strength between the rear portion of the front side rail portion 30 and the front portion of the rear side rail portion 50 can be improved.

Fifth Exemplary Embodiment

Finally, a suspension member 12 equipped with a vehicle frame structure 10 pertaining to a fifth exemplary embodiment will be described. The same reference signs are assigned to pans that are the same as those in the first exemplary embodiment, and detailed description (also including shared operation) will be appropriately omitted.

As shown in FIG. 8, the fifth exemplary embodiment differs from the first exemplary embodiment only in that the shape of the hole portion 52 formed in the front portion lower surface 45A of the lower rail portion 45 configuring the rear side rail portion 50 is a substantially gourd-like shape as seen in a bottom view, with regions, excluding some parts (on the neutral axis N), of the edge portion 52A configuring the hole portion 52 being linearly arc welded to the rear portion lower surface 28A of the lower mourn 28 configuring the front side rail portion 30.

That is to say, the welded portions 60 have wave-shaped weld lines 68 that form a substantially line-symmetrical shape whose axis of symmetry is the neutral axis N, as a result of a curving weld line that curves toward the neutral axis N being integrally formed with the middle portion of the first weld line 54 in the first exemplary embodiment. Additionally, a starting end portion 68A and a terminating end portion 68B of each wave-shaped weld line 68 on both the right and left sides of the neutral axis N are disposed in close proximity to the neutral axis N.

Even in the case of the welded portions 60 having the wave-shaped weld lines 68, the same operation as those in the first exemplary embodiment are obtained. In particular, the wave-shaped weld lines 68 can efficiently increase the weld lengths of the welded portions 60 compared to the first weld lines 54 formed in a straight line, so the joint strength between the rear portion of the front side rail portion 30 and the front portion of the rear side rail portion 50 can be improved.

The vehicle frame structure 10 pertaining to the exemplary embodiments has been described above based on the drawings, but the vehicle frame structure 10 pertaining to the exemplary embodiments is not limited to what is shown in the drawings and can undergo appropriate design changes in a range that does not depart from the spirit of the present disclosure. For example, the light metal material is not limited to aluminum alloy and may also be magnesium alloy.

Furthermore, the shape and numerical quantity of the hole portions 52 (the welded portions 60) are not limited to the shapes and numerical quantities shown in the drawings, and the shapes of the hole portions 52 (the welded portions 60) in the first exemplary embodiment to the fifth exemplary embodiment may also be appropriately combined. Furthermore, the welded portions 60 shown in the drawings have the starting end portion on their front side and the terminating end portion of their rear side, but the welded portions 60 are not limited to this. Moreover, the welded portions 60 may also be provided on just the right or left side of the neutral axis N.

Furthermore, the cross portions 36 of the front body mounts 22 and the front cross member 20 are not limited to having a cross-sectionally rectangular shape and may also have a cross-sectionally circular shape, for example. Furthermore, the welding for linearly joining the cross portions 36 of the front body mounts 22 to both end portions of the front cross member 20 and the welding (including the welded portions 60) for linearly joining the rear portions of the from side rail portions 30 to the from portions of the rear side rail portions 50 are not limited to arc welding and may also be laser welding, for example.

Furthermore, the vehicle frame structure 10 pertaining to the exemplary embodiments is not limited to being applied to the suspension member 12 and may also be applied to the front side members and rockers (not shown in the drawings), for example. That is to say, the vehicle frame structure 10 pertaining to the exemplary embodiments can be effectively applied to cases where plural frame members are joined to each other at plural joint portions including the welded portions 60 and where there is the potential for bending deformation in an in-plane direction to occur in the wall surfaces of the frame members in which the welded portions 60 are formed.

What is claimed is:

1. A vehicle suspension member structure comprising:
   a first frame member that has a closed cross-sectional shape as seen in a cross-sectional view orthogonal to an extension direction of the first frame member; and
   a second frame member that extends along the first frame member, overlaps a wall surface of the first frame member, and has a hole portion that exposes the wall surface, with an edge portion of the hole portion being joined to the wall surface by a linear welded portion,
   wherein both end portions of the welded portion are disposed in close proximity to a neutral axis of the first frame member and the second frame member in a case in which the first frame member and the second frame member have undergone bending deformation in an in-plane direction of the wall surface on which the welded portion is formed.

2. The vehicle suspension member structure according to claim 1, wherein the welded portion is provided on both sides of the neutral axis.

3. The vehicle suspension member structure according to claim 2, wherein the welded portions are provided so as to be line-symmetric to each other with the neutral axis serving as the axis of symmetry.

4. The vehicle suspension member structure according to claim 1, wherein the welded portion has a first weld line extending along the extension direction, second weld lines extending in a direction orthogonal to the extension direction, and curving weld lines that interconnect the first weld line and the second weld lines.

5. The vehicle suspension member structure according to claim 4, wherein the first weld line is formed in a wave shape.

6. A vehicle frame structure comprising:
   a first frame member that has a closed cross-sectional shape as seen in a cross-sectional view orthogonal to an extension direction of the first frame member; and
   a second frame member that extends along the first frame member, overlaps a wall surface of the first frame member, and has a hole portion that exposes the wall surface, with an edge portion of the hole portion being joined to the wall surface by a linear welded portion,
   wherein both end portions of the welded portion are disposed in close proximity to a neutral axis of the first frame member and the second frame member in a case in which the first frame member and the second frame member have undergone bending deformation in an in-plane direction of the wall surface on which the welded portion is formed, and
   wherein the welded portion has a first weld line extending along the extension direction, second weld lines extending in a direction orthogonal to the extension direction, and curving weld lines that interconnect the first weld line and the second weld lines.

7. A vehicle frame structure comprising:
   a first frame member that has a closed cross-sectional shape as seen in a cross-sectional view orthogonal to an extension direction of the first frame member; and
   a second frame member that extends along the first frame member, overlaps a wall surface of the first frame member, and has a hole portion that exposes the wall surface, with an edge portion of the hole portion being joined to the wall surface by a linear welded portion,
   wherein both end portions of the welded portion are disposed in close proximity to a neutral axis of the first frame member and the second frame member in a case in which the first frame member and the second frame member have undergone bending deformation in an in-plane direction of the wall surface on which the welded portion is formed,
   wherein the welded portion has a first weld line extending along the extension direction, second weld lines extending in a direction orthogonal to the extension direction, and curving weld lines that interconnect the first weld line and the second weld lines, and
   wherein the first weld line is formed in a wave shape.

* * * * *